United States Patent [19]

Shackford

[11] 3,908,166

[45] Sept. 23, 1975

[54] KEY OPERATED DEMAND METER COVER RESET MECHANISM

[75] Inventor: Ernest B. Shackford, Durham, N.H.

[73] Assignee: General Electric Company, Schenectady, N.Y.

[22] Filed: Dec. 20, 1973

[21] Appl. No.: 426,957

[52] U.S. Cl. .................. 324/103 R; 235/144 MA
[51] Int. Cl.² ................. G01R 19/16; G06C 15/42
[58] Field of Search .......... 235/144 MA; 324/103 R

[56] References Cited
UNITED STATES PATENTS

| | | | |
|---|---|---|---|
| 2,123,943 | 7/1938 | Hamill | 324/103 R |
| 2,313,908 | 3/1943 | Adams | 324/103 R |
| 3,721,901 | 3/1973 | Ham | 324/103 R |

*Primary Examiner*—Alfred E. Smith
*Assistant Examiner*—Ernest F. Karlsen
*Attorney, Agent, or Firm*—Vale P. Myles

[57] ABSTRACT

A kilowatt demand indicating meter, cover (housing) mounted rotary reset actuator incorporating a combination key operated, tamper resistant security lock and a rotary motion limiting device.

4 Claims, 4 Drawing Figures

US Patent Sept. 23,1975 3,908,166
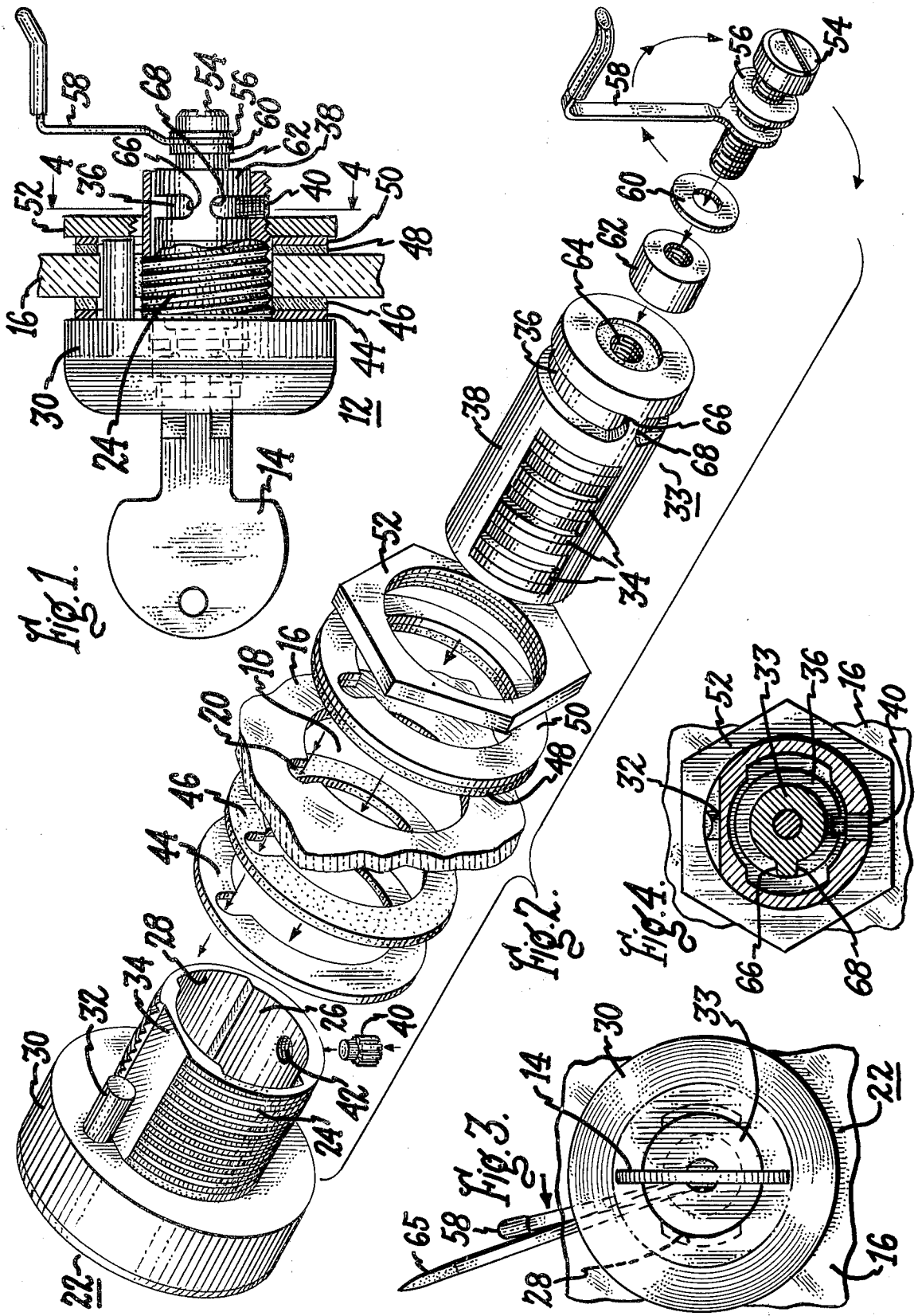

3,908,166

KEY OPERATED DEMAND METER COVER RESET MECHANISM

BACKGROUND OF THE INVENTION

My invention relates to a kilowatt demand indicating meter and more particularly to a cover mounted rotary reset actuator incorporating a combination key operated, tamper resistant security lock and a rotary motion limiting device.

Kilowatt demand meters are well-known in the prior art. A common type of demand meter currently in use by the electric utility industry is a conventional watthour meter mechanism, used in combination with a timing element, to sum up the kilowatt hours of energy measured by the watthour meter in a pre-selected time span called a demand interval. Usually a demand interval of 15 or 30 minutes is selected for such meters. In order to indicate the maximum power demand on a customer's system in a given billing period, such as during a one month span, an indicating mechanism is incorporated in all demand meters. One conventional form of such an indicating mechanism comprises a simple pointer-pusher device that pushes an indicating pointer up-scale as it is rotated by the watthour mechanism during a given demand interval. Thus, the pointer will indicate the maximum power demand measured by the meter during any demand interval occurring in the billing period. At the end of the billing period the indicator pointer is rotated down-scale to the full reset position by the mechanical engagement of the cover (housing) mounted reset actuator with the indicator pointer. Thus, when the pointer moves up-scale it acts as an indicator of peak power consumed during any demand interval in a billing period while during reset the pointer functions as a reset arm.

One problem associated with previous reset actuator mechanisms was that they incorporated a rotatable reset shaft that was locked in a non-reset position during the billing period with a soft-metal seal. These seals, while being capable of providing an indication of tampering, do not, in fact, do so because the people reading these meters very often do not pay as close attention to inspection of these seals as they should, resulting in underbilling of electric power customers.

Another problem associated with prior art demand meter reset actuators is that it is possible to apply an excessive amount of torque to either the demand meter reset mechanism or to demand meter support structure internal of the demand meter housing needlessly stressing or overstressing these portions of the demand meter.

SUMMARY OF THE INVENTION

A primary object of the present invention is to provide a cover (housing) mounted reset actuator for a demand meter which incorporates a key operated tamper resistant security lock.

Another object of the present invention is to provide a demand meter cover (housing) mounted reset actuator incorporating a rotary motion reset torque limiting device that prevents the forces associated with the reset function from needlessly stresssing or overstressing demand meter structure internal of the demand meter housing.

Still another object of the present invention is to provide a demand meter cover (housing) reset actuator having a rotary motion reset torque limiting device capable of being constructed such that rotation of the reset actuator relative to the demand meter cover can be limited to any predetermined rotational angle.

A kilowatt demand indicating meter, cover (housing) mounted reset actuator having a combination key operated tamper resistant security lock and rotary motion limiting reset device is provided. The key operated security lock extends through the meter housing and has a plug member that mechanically engages the demand indicator and reset arm. A barrel member is attached to the meter housing to rotatably support the plug member. A groove extends around a portion of the lateral surface of the plug member in a plane generally orthogonal to the plug member's axis of rotation. A pin fixedly attached to the barrel member extends into the aforementioned plug member groove. Rotation of the plug member in one direction or the other is limited by the engagement of the barrel mounted pin with either end of the plug member groove into which the pin extends. The length of the rotation limiting groove is directly related to the amount of rotation required to rotate the indicator and reset arm to the full reset position from any power demand indication within the capacity of the demand meter, without subjecting the mechanism associated with the indicator and reset arm to an excessive amount of force. Tumblers mounted in the plug member engage cavities in the barrel member to prevent rotation of the plug member with respect to the barrel member when the security lock is in the locked position. A key inserted in the plug member portion of the security lock causes the tumblers to retract into the plug member allowing the plug member to be rotated into mechanical engagement with the indicator and reset arm.

The invention which is sought to be protected will be particularly pointed out and distinctly claimed in the claims appended thereto. However, it is believed that this invention, and the manner in which its objects and advantages are obtained as well as other objects and advantages thereof, will be more readily understood by reference to the following detailed description of a preferred embodiment thereof particularly when considered in light of the accompanying drawings.

BRIEF DESCRIPTION OF THE DRAWINGS

FIG. 1 is a side elevation, partly in section, of the key operated reset actuator, with key inserted, shown mounted on the demand meter housing.

FIG. 2 is an exploded view, in perspective, of the key operated reset actuator of the present invention.

FIG. 3 is a front view of the key operated reset actuator of the present invention depicting an arm, fixedly attached to the plug member portion of the security lock, mechanically engaging the indicator and reset arm during reset.

FIG. 4 is a sectional view taken along the line 4—4 in FIG. 1.

DESCRIPTION OF THE PREFERRED EMBODIMENT

Referring now to the drawings and the preferred embodiment, wherein like numerals are used to indicate like parts throughout, in FIG. 1 the key operated reset actuator 12, with key 14 inserted, is shown mounted to demand meter housing 16. For a detailed description of key operated reset actuator 12 reference should here be made to FIG. 2. In FIG. 2 demand meter housing 16 is depicted having cylindrical hole 18 extending therethrough, hole 18 having notched opening 20 extending radially therefrom. Barrel member 22 has a cylindrical shaped portion 24 with external threads and a cylindrical opening 26 extending therethrough concentric with the longitudinal axis of said barrel member 22 having a pair of cavities 28 extending radially outward from cylindrical opening 26. Additionally, barrel member 22 has shoulder portion 30 at one end extending radially outward therefrom with pin 32 extending from said shoulder portion 30 in a direction parallel to and radially spaced from the longitudinal axis of barrel member 22. In this preferred embodiment a cylindrical segment 34 has been removed from the cylindrical shaped portion 24 on barrel member 22 so that said cylindrical shaped portion 24 will not interfere with said pin 32 extending from said shoulder portion 30 of barrel member 22. Cylindrical plug member 33, has key actuated tumblers 34 radially extendable therefrom and has groove 36 near one end called the grooved end and has a slot at the opposite end called the key end for the insertion of said tumbler retracting key 14. Groove 36 extends around a portion of the lateral surface 38 of plug member 33 in a plane generally orthogonal to the longitudinal or rotational axis of said plug member 33. The key-end of plug member 33 is fully inserted into the non-shouldered end of opening 26 in barrel member 22 and then pin 40 is forced into opening 42 in the cylindrically shaped portion 24 of barrel member 22 to the point where said pin 40 is fully inserted in groove 36 of plug member 33 without preventing plug member 33 from rotating with respect to said pin 40. This places pin 40 in a fixed relation with respect to barrel member 22. Flat metal washer 44 and flat cork washer 46 having apertures that conform to the combined shape of hole 18 and notched opening 20 in demand meter housing 16 are placed over the cylindrical portion 24 of barrel member 22, respectively, such that pin 32 extending from shoulder portion 30 of barrel member 22 passes through the notched opening portions of metal washer 44 and cork washer 46. Cylindrical end 24 of barrel member 22 is then inserted through opening 18 in housing 16 such that pin 32 extending from said shoulder portion 30 of barrel member 22 passes through notched opening 20 in housing 16. With this arrangement, rotation of barrel member 22 with respect to housing 16 is prevented by the engagement of pin 32 with said housing 16. Cork washer 48 and metal washer 50 having the same size openings as hole 18 through housing 16 are placed over that portion of barrel member 22 extending through housing 16 respectively, and then nut 52 is screwed onto the externally threaded cylindrically shaped portion 24 of barrel member 22 to the point where barrel member 22 is securely fastened to housing 16. Screw 54 is inserted through metal flat washer 56 and an aperture in L-shaped arm 58, metal flat washer 60 and spacer 62, respectively, and then said screw 54 is screwed into tapped hole 64 in the grooved end of plug member 33 to the point where L-shaped arm 58 is fixedly attached to said plug member 33. L-shaped arm 58 is oriented such that one leg of said L-shaped arm 58 extends laterally from said plug member 33 and the remaining leg of said L-shaped arm 58 is generally parallel to the longitudinal axis of said plug member 33. The parallel oriented leg portion of said L-shaped arm 58 extends away from barrel member 22 toward indicator and reset arm 65 which is illustrated in FIG. 3.

Referring here to FIG. 3, shoulder portion 30 and the key end of plug member 33 are shown with key 14 inserted into said plug member 33. The insertion of key 14 into plug member 33 has caused tumblers 34 to be retracted from cavities 28 in the cylindrical portion 24 of barrel member 22 into said plug member 33 thereby allowing said plug member 33 to be rotated with respect to barrel member 22. Plug member 33 has been rotated counterclockwise to the point where said L-shaped arm 58, fixedly attached to the grooved end of plug member 33, has engaged said indicator and reset arm 65.

Down-scale rotation of L-shaped arm 58 and therefore the down-scale rotation of indicator and reset arm 65 is limited by the engagement of said pin 40 mounted in barrel member 22 with an end of groove 36 in plug member 33. This rotation limiting feature is best understood by referring here to FIG. 4. FIG. 4 which is a sectional view taken along the line 4—4 in FIG. 1 shows pin 40 inserted in groove 36 of plug member 33. Groove 36 appears C-shaped in this sectional view, said groove 36 having rotation limiting ends 66 and 68 at the ends thereof. The rotational position of pin 40 with respect to groove 36 and plug member 33 as shown in this sectional view, is that rotational position attained when key operated actuator 12 is in the locked position. In this preferred embodiment, when pin 40 engages end 66 of groove 36, key operated actuator 12 is in the full reset position. The length of groove 36 determines the magnitude of rotational movement of plug member 33 and the L-shaped arm 58. When end 66 of groove 36 engages pin 40, rotational or reset forces in excess of that required to maintain indicator and reset arm 65 in the full reset position are reacted against housing 16 due to the fact that pin 40 is fixedly mounted in barrel member 22 and barrel member 22 is fixedly attached to housing 16. In previous meter designs these excessive reset forces were reacted against stops mounted on the demand meter or demand meter support structure.

There is thus described a novel kilowatt demand indicating meter, cover mounted rotary reset actuator incorporating a combination key operated tamper resistant security lock and rotary motion limiting device.

GENERAL CONSIDERATIONS

The term rotatable reset shaft used herein is the equivalent of plug member 33 and the term bearing, also used herein, is the equivalent of barrel member 22. The aforementioned equivalent terms are intended to be representative and not exclusive.

When the term "full reset" is used in order to define the length of groove 36 in plug member 33 required to return indicator and reset arm 65 to the zero indication position, the elastic limit of said indicator and reset arm 65, as well as the stress limitations of the mechanisms associated with said indicator and reset arm 65 are the main factors that are considered.

It should be understood that reversing the relative positions of groove 36 and pin 40 is within the scope of my invention. Specifically, groove 36 could be contained in barrel member 22 and pin 40 could be mounted in plug member 33.

In the preferred embodiment, mechanical engagement of plug member 33 with indicator and reset arm 65 is accomplished by the engagement of L-shaped arm 58, fixedly attached to plug member 33, with indicator and reset arm 65 when plug member 33 is rotated in a down-scale direction during reset. Varying the shape of L-shaped arm 58, the method of mounting same or even fabricating an equivalent L-shaped arm 58 as part of plug member 33 is also within the scope of my invention.

It will be apparent to those skilled in the art from the foregoing description of my invention that various improvements and modifications can be made in it without departing from the true scope of same. Accordingly, it is my intention to encompass within the scope of the appended claims the true limits and spirit of my invention.

What I claim as new and desire to secure by letters patent of the United States is:

1. In combination with a demand meter of the type having a demand register disposed inside a housing, the register being provided with a rotatable demand indicator and reset arm with one end of said reset arm adjacent a portion of said housing and mechanically engaging a reset actuator, the actuator transferring a reset torque applied outside the housing to the reset arm inside the housing, the improvement comprising that the reset actuator comprises:
   a. a rotatable reset shaft, extending through the housing for transmitting a torque therethrough;
   b. a bearing, fixedly mounted to said housing, for rotatably supporting said reset shaft;
   c. means mounted between said reset shaft and said bearing, said means being operable to alternately prevent and permit rotation of said reset shaft with respect to said bearing;
   d. means for coupling a reset torque, applied to said reset shaft, to said demand indicator and reset arm; and
   e. rotation limiting means incorporated in said reset actuator, said means having a limit stop mounted in fixed position relative to said housing for limiting the amount of rotation of said reset shaft with respect to said reset arm by reacting reset forces against said housing responsive to the reset arm being moved to a full reset position, thereby to terminate the application of reset force to the reset arm and to avoid overstressing said reset arm and the reset mechanisms associated therewith.

2. An improved demand meter reset actuator as defined in claim 1 wherein the rotation limiting means comprises:
   a. a rotatable reset shaft, having a groove extending around a portion of the lateral surface of said reset shaft in a plane generally orthogonal to the axis of rotation of said reset shaft, the angle subtended by the length of said groove being equal to the rotation angle required to rotate the demand meter reset arm and mechanism to the full reset position from any power demand indication within the capacity of said demand meter while at the same time limiting the amount of force transmitted to said reset mechanism; and
   b. a pin, comprising said limit stop, fixedly attached to said bearing, having one end of said pin extending into said groove in said reset arm, rotation of said reset shaft being limited by the engagement of said fixedly attached pin with an end of said reset shaft groove.

3. In combination with a demand meter of the type having a demand register disposed inside a housing, the register being provided with a rotatable demand indicator and reset arm with one end of said reset arm adjacent a portion of said housing and mechanically engaging a reset actuator, the actuator transferring the reset torque applied outside the housing to the reset arm inside the housing, the improvement comprising that the reset actuator comprises a key operated security lock, said key operated security lock further comprising:
   a. a plug member, extending through said housing, mechanically engaging said reset arm, said plug member having a groove extending around a portion of its lateral surface in a plane generally orthogonal to the axis of rotation of said plug member;
   b. a barrel member, for rotatably supporting said plug member, said barrel member being fixedly attached to said housing;
   c. a pin, fixedly attached to said barrel member, extending into said groove in said plug member rotation of said plug member being limited by the engagement of said fixedly attached pin with either end of said groove, the length of said groove being directly proportional to the amount of rotational movement required to move said reset arm to the full reset position from any power demand indication position within the capacity of said demand meter.

4. An improved demand meter reset actuator as defined in claim 3 wherein the mechanical engagement of said plug member with said reset arm is accomplished by an L-shaped arm fixedly attached to said plug member, a first leg of said L-shaped arm extending laterally from said plug member and the second or remaining leg of said L-shaped arm extending from said first leg in a direction generally parallel to the longitudinal axis of said plug member.

* * * * *